United States Patent
Raghavan et al.

(10) Patent No.: US 10,946,476 B2
(45) Date of Patent: Mar. 16, 2021

(54) HEAT TREATMENT AND STRESS RELIEF FOR SOLID-STATE WELDED NICKEL ALLOYS

(71) Applicant: United Technologies Corporation, Farmington, CT (US)

(72) Inventors: Ashwin Raghavan, West Hartford, CT (US); Enrique E. Montero, Marlborough, CT (US); Max A. Kaplan, West Hartford, CT (US); Eli N. Ross, Vernon, CT (US); Mario P. Bochiechio, Vernon, CT (US)

(73) Assignee: Raytheon Technologies Corporation, Waltham, MA (US)

( * ) Notice: Subject to any disclaimer, the term of this patent is extended or adjusted under 35 U.S.C. 154(b) by 685 days.

(21) Appl. No.: 15/593,006

(22) Filed: May 11, 2017

(65) Prior Publication Data
US 2018/0326533 A1 Nov. 15, 2018

(51) Int. Cl.
| B23K 20/00 | (2006.01) |
| B23K 20/233 | (2006.01) |
| C22C 19/03 | (2006.01) |
| C22F 1/10 | (2006.01) |
| B23K 20/12 | (2006.01) |
| B23K 11/04 | (2006.01) |
| B23K 35/30 | (2006.01) |
| B23K 101/00 | (2006.01) |

(52) U.S. Cl.
CPC ............ B23K 20/233 (2013.01); B23K 11/04 (2013.01); B23K 20/12 (2013.01); B23K 35/3033 (2013.01); C22C 19/03 (2013.01); C22F 1/10 (2013.01); *B23K 2101/001* (2018.08)

(58) Field of Classification Search
CPC ............ B23K 2101/001; B23K 20/129; B23K 2103/08; B23K 26/342
See application file for complete search history.

(56) References Cited

U.S. PATENT DOCUMENTS

| 6,098,871 A | 8/2000 | Cairo et al. |
| 7,341,431 B2 | 3/2008 | Trewiler et al. |
| 7,553,384 B2 | 6/2009 | Groh |
| 7,708,846 B2 | 5/2010 | Malley |
| 8,266,800 B2 | 9/2012 | Segletes et al. |

(Continued)

FOREIGN PATENT DOCUMENTS

| EP | 1790750 A2 | 5/2007 |
| EP | 2353750 A1 | 8/2011 |
| WO | 2008072303 A1 | 3/2010 |

OTHER PUBLICATIONS

D. U. Furrer, et al., "Optimizing the Heat Treatment of Ni-Based Superalloy Turbine Discs", from JOM, Mar. 2003, pp. 32-34.

(Continued)

*Primary Examiner* — Erin B Saad
(74) *Attorney, Agent, or Firm* — Kinney & Lange, P.A.

(57) ABSTRACT

A joining method includes performing a first heat treatment step on a first superalloy workpiece and a second superalloy workpiece wherein at least one of the first and second superalloy workpieces include a gamma matrix phase and a gamma-prime precipitate phase. The first and second superalloy workpieces are joined using a solid state joining process, subjected to a post-weld stress relief operation and a final aging heat treatment.

6 Claims, 2 Drawing Sheets

(56) References Cited

U.S. PATENT DOCUMENTS

| | | |
|---|---|---|
| 8,480,368 B2 | 7/2013 | Tolbert et al. |
| 8,918,996 B2 | 12/2014 | Wessman et al. |
| 9,156,113 B2 | 10/2015 | Wessman et al. |
| 9,175,373 B2 | 11/2015 | Bruck et al. |
| 9,243,514 B2 | 1/2016 | Krotzer, Jr. et al. |
| 9,528,175 B2 | 12/2016 | Angal et al. |
| 2010/0229387 A1 | 9/2010 | Sasu |
| 2012/0205014 A1 | 8/2012 | Bruck et al. |
| 2017/0304900 A1* | 10/2017 | Strangman ............... C22F 1/10 |

OTHER PUBLICATIONS

Z. W. Huang, et al., "Inertia Friction Welding Dissimilar Nickel-Based Superalloys Alloy 720Li to IN718", from Metallurgical and Materials Transactions A, vol. 38A, Jul. 2007, pp. 1608-1620.

Extended European Search Report for EP Application No. 18161265.6, dated Sep. 28, 2018, 5 pages.

* cited by examiner

HEAT TREATMENT AND STRESS RELIEF FOR SOLID-STATE WELDED NICKEL ALLOYS

STATEMENT OF GOVERNMENT INTEREST

This invention was made with Government support under FA8650-09-D-2923-0021 awarded by United States Air Force. The Government has certain rights in this invention.

BACKGROUND

The disclosure relates generally to joining and heat treating alloys, and more specifically to heat treatment and stress relief in nickel alloys.

Components using nickel-based powder metallurgy superalloys are generally fabricated using solid-state welding processes, such as inertial friction welding, due to weldability issues associated with fusion welding. These alloys are often welded in the fully heat treated condition (i.e. solution, stabilization, and age), followed by a post weld stress relief (PWSR) after joining. Temperatures and times during a PWSR cycle, however, can result in over-aging of the gamma-prime strengthening precipitates in the base material, thereby resulting in a reduction in base metal strength in some cases. This reduction in strength can influence the design or limit the operational parameters during life of the part.

SUMMARY

A joining method includes performing a first heat treatment step on a first superalloy workpiece and a second superalloy workpiece wherein at least one of the first and second superalloy workpieces include a gamma matrix phase and a gamma-prime precipitate phase. The first and second superalloy workpieces are joined using a solid state joining process, subjected to a post-weld stress relief operation, and a final aging heat treatment.

An embodiment of a welded structure includes a weld region joining a first superalloy workpiece and a second superalloy workpiece. The first and second superalloy workpieces include respective first and second base material regions including a solution-treated gamma matrix phase and a gamma-prime precipitate phase. The weld region includes a heat-affected zone of the first and second superalloy workpieces adjacent to a portion of the first and second base material regions. The weld region, including the heat affected zone, is not stress-relieved such that the portions of the first and second base material regions, adjacent to the heat affected zone, are not aged.

An embodiment of a welded structure includes a weld region joining a first superalloy workpiece and a second superalloy workpiece. The first and second superalloy workpieces include respective first and second base material regions including a solution-treated gamma matrix phase and a gamma-prime precipitate phase. The weld region includes a heat-affected zone of the first and second superalloy workpieces adjacent to a portion of the first and second base material regions. The weld region, including the heat affected zone, includes a post-weld stress relief region such that the portions of the first and second base material regions, adjacent to the heat affected zone, are not overaged.

DETAILED DESCRIPTION

Figure 1:
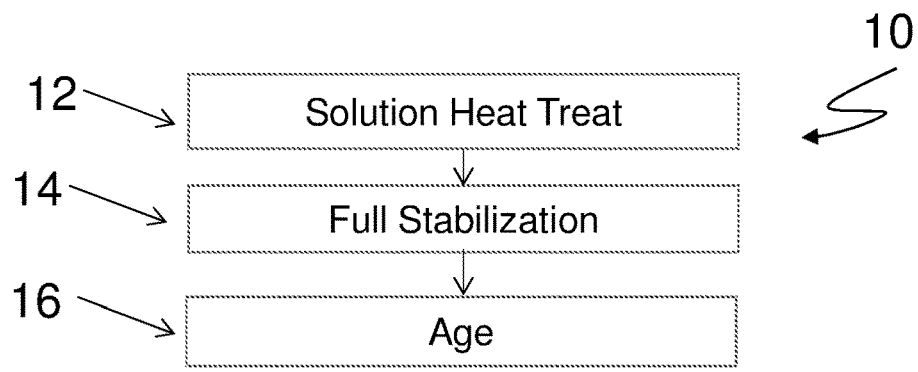
FIG. 1 is a prior art heat treatment flow chart for nickel-based superalloys.

FIG. 1 outlines an accepted thermal processing and heat treatment schedule 10 for advanced nickel-based superalloys, such as those used in gas turbine engine applications. In step 12, typically occurring soon after forging, the alloys are first subjected to a super-solvus solution heat treatment in excess of about 1900° F. (1039° C.), or otherwise above the gamma-prime solvus temperature of a particular alloy for a time sufficient to dissolve strengthening phases such as gamma-prime which were precipitated irregularly during initial solidification. This temperature is alloy dependent, although around 2000° F. and above, super-solvus heat treatment can result in grain coarsening due to absence of gamma-prime precipitates to pin grain boundaries. Holding times of a few hours at temperature at or immediately above the solution temperature may be sufficient to achieve desired phase solution. Air cooling or faster cooling is then performed to re-precipitate a refined microstructure of strengthening gamma-prime phase during cool down.

In the next step, the alloy is typically subjected to a full stabilization (step 14) heat treatment at an elevated temperature. A full stabilization, immediately after solution treatment, may form or grow carbides and borides on grain boundaries to increase grain boundary strengthening, in addition to enabling a determined amount of gamma-prime growth. A stabilization cycle as part of step 14 is also necessary to provide residual stress relief accumulated during forging and solution heat treatment. Some stabilization heat treatment temperatures are in the vicinity of 1500° F. (816° C.). Around this temperature, a cycle time on the order of 4 hours is necessary for full stabilization to occur. As taught by commonly owned U.S. Pat. No. 7,708,846 to Malley, incorporated herein in its entirety by reference, shorter duration, higher temperature full stabilization cycles had been found to improve creep and stress rupture properties of both cast/wrought and powder metal forms of nickel based super alloys. The combination of time and temperature also further stabilizes the microstructure by spheroidizing and reducing the size of carbides and borides formed in the microstructure during step 14. Exemplary temperatures for the accelerated stabilization treatment are about 1800° F. (982° C.) and exemplary times are about 1 hour.

Finally, the precipitation hardened and stabilized alloy is then typically subjected to aging (step 16), which results in controlled aging of gamma-prime strengthening phase in the gamma phase matrix and provides more relief of accumulated residual stresses. This temperature will be alloy dependent and application specific. Different stabilization and aging temperatures can be selected for these alloys in order to optimize specific material properties (e.g. creep). Aging at about 1350° F. (732° C.) for a time on the order of eight hours is typical but parameters can be varied in time and/or temperature for a given composition.

Figure 2:
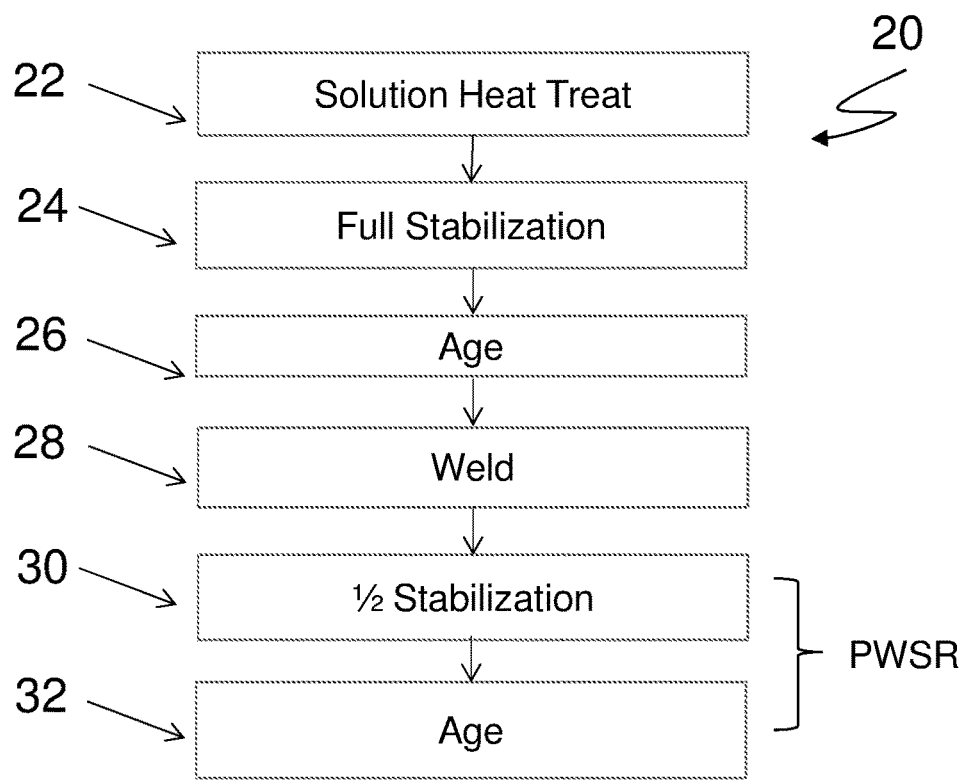
FIG. 2 is a prior art flow chart for heat treating welded nickel-based superalloys.

Prior art joining and heat treatment process 20 is shown in FIG. 2. When joining one or more nickel-based superalloy components or workpieces, all of the conventional heat treatment steps are performed prior to joining. Joining such as through friction welding or other forms of solid-state welding are known to subsequently require a post weld stress relief (PWSR) cycle, performed at least around the weld region.

Thus in a typical joining and heat treatment process for nickel-based superalloy components, the superalloy is first solution heat treated (step 22), fully stabilized (step 24), and aged (step 26) as described above. Components are then joined such as by a solid state or other welding process (step 28). The PWSR treatment may include a high temperature stabilization treatment for between one-half the normal stabilization time, such as 2 hours to 4 hours, up to a full stabilization treatment (step 30), also as described with respect to FIG. 1. These ranges will be alloy dependent, as it depends on the stress relaxation behavior of the weld material during PWSR. The post-weld stabilization 30 can be followed by a normal aging treatment (step 32). The process outlined in FIG. 2 results in an over-aging of the base material around the weld, adjacent to and including the heat affected zone (HAZ). While the HAZ contains gamma-prime phase, the precipitate structure is much finer than in the base metal. Therefore, the PWSR will likely result in property improvement within the weld due to precipitation and coarsening of gamma-prime precipitates, whereas a degradation in base metal properties occurs due to over-aging of the gamma-prime precipitates formed during the initial full heat treatment process. This over-aging is due to added time at elevated temperature, since the base metal near the weld has effectively been exposed to multiple stabilization and aging processes reducing the mechanical properties and microstructures as compared to the unwelded components. In certain prior art processes, depending on alloy composition, the alloy can undergo constitutional liquation near its grain boundaries during the welding process as described below.

Figure 3:
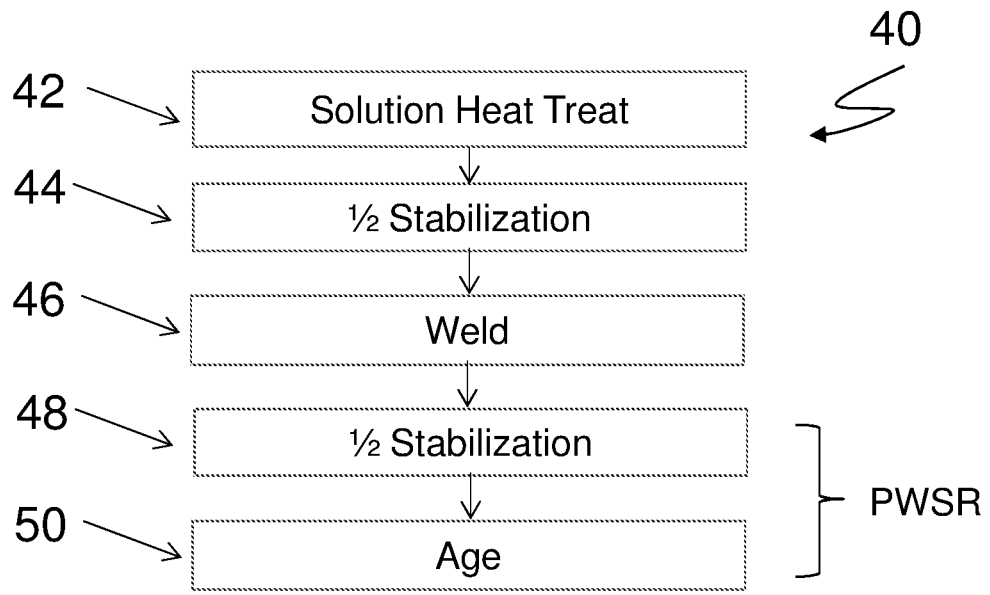
FIG. 3 is a first flow chart for heat treating and joining nickel-based superalloys according to the disclosure.

An appropriate heat treatment and stress relief process 40 for welded nickel superalloys is shown in FIG. 3. Candidate alloys for the joining processes of the present disclosure can include coarse grain powder alloys, such as but not limited to IN100, ME3, NF3, LSHR, PRM48, Rene 88, Rene 95, and/or RR1000.

Process 40 starts with both superalloy components or workpieces being subjected to a solution heat treatment (step 42). In one example, gamma-prime strengthening phases from the initial solidification process are dissolved by heating the workpieces above a solvus temperature in excess of about 1900° F. (1038° C.) for holding times of about a few hours as described earlier with respect to FIG. 1. In the next step (44), both components are subjected to a partial high temperature stabilization heat treatment. A partial stabilization, for up to one half the time required for a full stabilization treatment, can be performed to provide stress relief prior to welding to prevent distortion during the weld process. Partial stabilization permits some relief of accumulated residual stress from forging and solution heat treatment to prevent distortion during inertia weld. It also allows the precipitation and growth of gamma-prime precipitates in the gamma matrix, providing some coherency strain between the matrix and the precipitates during the welding stage.

In one example of a partial standard stabilization, the components/workpieces are heated to a vicinity of 1500° F. (816° C.) but for no more than 2 hours. In another example, accelerated stabilization can be performed at elevated temperature on the order of 1800° F. (982° C.) but for no more than ½ hour. This also minimizes over aging the base metal structure following final thermal processing steps described below. In certain embodiments (e.g., FIG. 4), stabilization treatment is not performed at all prior to joining.

In the next step (46), the components are joined by solid state welding. Since joining fully heat treated advanced nickel based superalloy components by fusion welding is not suitable because fusion welding results not only in solidification cracking of these alloys, but strain age cracking also frequently occurs during post-fusion weld stress relief. Even with solid state welding procedures, strain age cracking can be an issue for these types of alloys. A non-limiting example of a solid state welding process is friction welding, which minimizes the heat affected zone in and around the join area. Other acceptable solid state welding procedures include linear friction welding, friction plug welding, and rotary friction welding.

Following welding, step 48 includes subjecting the structure to a stabilization heat treatment. This can include at least the remainder of the stabilization heat treatment which would have otherwise been performed at step 44. It can alternatively include a full stabilization process (either standard, accelerated, or otherwise). As noted above, stabilization heat treatments are necessary to develop a microstructure with superior elevated temperature stability in service and provide stress relief.

Part of the stabilization and aging processes results in modification of the gamma-prime precipitate structure, as well as borides, carbides, etc., A boride or carbide particle, if intersected by a grain boundary at high temperatures, (e.g., as seen during welding) will devolve into constituent elements including boron and carbon. In sufficient quantities, these constituent elements can operate as melting point depressants and may therefore result in grain boundary liquation in the HAZ during welding. But by limiting the time of an initial high temperature stabilization treatment, or omitting it altogether (see FIG. 4), one can minimize the presence of grain boundary borides and carbides during the welding step, and in turn minimize the occurrence of liquation during welding.

Following the second stabilization heat treatment, the welded structure is given an aging treatment to modify the structure of gamma-prime strengthening phase in the gamma matrix to form a fully heat treated superalloy structure (step 50). As mentioned earlier, an acceptable aging heat treatment may be 1350° F. (732° C.) for 8 hours followed by an air cool.

In other embodiments designed to minimize liquation in solid state welds in superalloys of the present invention, the high temperature stabilization heat treatment may be postponed until after the structure is welded. Process 60 shown in FIG. 4 adapts this procedure. As before, components of a superalloy structure designated for joining by solid state welding are subjected to a solution heat treatment to dissolve existing gamma-prime strengthening phase by heating to about 1900° F. (1038° C.) for a time sufficient to dissolve gamma-prime (step 62). In addition to dissolving gamma-prime, minor phases containing high concentrations of melting point suppressing species such as borides are also dissolved. Holding times of a few hours may be sufficient as mentioned earlier. Quenching can also prevent the formation of boride phases, preventing the formation of phases that are susceptible to liquation during welding. In the embodiment, the fully solution heat treated components are joined by solid state welding (step 64). A preferred solid state welding process is friction welding.

After welding, the joined structure is subjected to a full stabilization treatment (step 66). This may be a standard stabilization or an accelerated high temperature stabilization treatment of about 1800° F. (982° C.) for about one hour or as otherwise described above, thereby modifying grain boundary carbides, borides, or other particles in the microstructure and to further stabilize the microstructure. Finally, the welded structure is given an aging heat treatment (step 68) such as is described in earlier processes (e.g., at about 1350° F./732° C.) for about 8 hours) to grow very fine gamma-prime throughout the microstructure, as well as provide additional stress relief.

Figure 4:
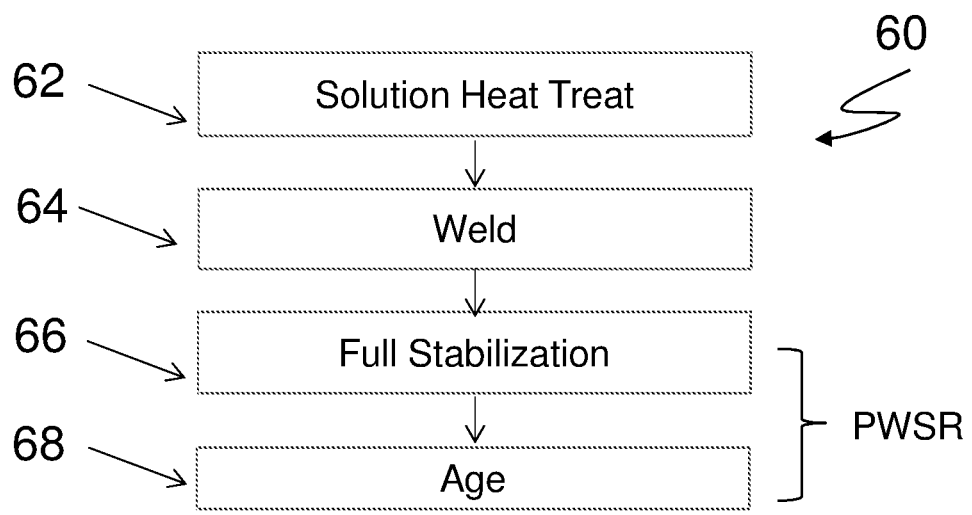
FIG. 4 is a second flow chart for heat treating and joining nickel-based superalloys according to the disclosure.

The result of the processes described broadly in FIGS. 3 and 4 is a welded structure with at least first and second superalloy workpieces, one or both having respective first and second base material regions including a solution-treated gamma matrix phase and a gamma-prime precipitate phase. The workpieces are joined at a weld region to form the welded structure. The weld region includes a heat-affected zone of the first and second superalloy workpieces adjacent to a portion of the first and second base material regions.

Prior to welding, the weld region, including the heat affected zone, is not stress-relieved such that the base material regions adjacent to the heat affected zone are not aged, prior to a post-weld stress relief. As noted with respect to the prior art process of FIG. 2, conventional solid state welded superalloy structures undergo a full heat treatment including full stabilization and aging processes immediately prior to the joining process. Full stabilization results in borides, carbides, or other grain boundary strengtheners, derived from one or more constituent elements operative to reduce the melting temperature of the gamma matrix phase being formed in the weld region, including in a portion of the base material regions around the heat affected zone. And the fully aged material, following a post-weld stress relief that includes a second aging step, can result in overaging of the base material around the heat affected zone, weakening it as compared to the rest of the base material. The overaged base material is much more susceptible to strain age cracking as compared to the rest of the base material.

Here, following the processes in FIGS. 3 and 4, the base material regions adjacent to the heat affected zone are partially but not fully stabilized before welding, avoiding accumulation of one or more constituent elements (e.g., boron or carbon) at or proximate a plurality of grain boundaries adjacent to the heat affected zone. As a result, after welding, the weld region joining the first and second superalloy workpieces, including a heat-affected zone of the first and second superalloy workpieces adjacent to a portion of the first and second base material regions, a post-weld stress relieved region such that the base material region adjacent to the heat affected zone that is not overaged, and has comparable or equivalent mechanical properties to the remainder of each corresponding base material region. This facilitates welded superalloy components such as, but not limited to rotor components, bladed disks, and shaft components for turbine engines.

Discussion of Possible Embodiments

The following are non-exclusive descriptions of possible embodiments of the present invention.

A joining method includes performing a first heat treatment step on a first superalloy workpiece and a second superalloy workpiece wherein at least one of the first and second superalloy workpieces include a gamma matrix phase and a gamma-prime precipitate phase. The first and second superalloy workpieces are joined using a solid state joining process, subjected to a post-weld stress relief operation, and a final aging heat treatment.

The method of the preceding paragraph can optionally include, additionally and/or alternatively, any one or more of the following features, configurations and/or additional components:

A joining method according to an exemplary embodiment of this disclosure, among other possible things includes performing a first heat treatment step on a first superalloy workpiece and a second superalloy workpiece, at least one of the first and second superalloy workpieces comprising a gamma matrix phase and a gamma-prime precipitate phase; metallurgically joining the first and second superalloy workpieces using at least one solid-state joining process; and performing a post-weld stress relief operation on the joined first and second superalloy workpieces; wherein the first heat treatment step excludes an aging heat treatment.

A further embodiment of the foregoing method, wherein the at least one of the first and second superalloy workpieces further comprises a first constituent element operative to reduce a melting temperature of the gamma phase.

A further embodiment of any of the foregoing methods, wherein the first constituent element comprises boron or carbon.

A further embodiment of any of the foregoing methods, wherein the first constituent element is entirely dispersed in the gamma phase after the first heat treatment step.

A further embodiment of any of the foregoing methods, wherein the first heat treatment step consists of a solution heat treatment.

A further embodiment of any of the foregoing methods, wherein the metallurgical joining step is performed after the first heat treatment step without an intervening second heat treatment step.

A further embodiment of any of the foregoing methods, further comprising a second heat treatment step after the first heat treatment step and prior to the metallurgical joining step, the second heat treatment step excluding an aging heat treatment.

A further embodiment of any of the foregoing methods, wherein the second heat treatment step consists of a partial stabilization step terminating prior to substantial accumulation of the first constituent element at or proximate a plurality of grain boundaries in an area of the first and second workpieces to be joined during the metallurgical joining step.

A further embodiment of any of the foregoing methods, wherein the post-weld stress relief operation comprises a third heat treatment step performed on a heat affected zone after the metallurgical joining step, the third heat treatment step consisting of a partial stabilization step terminating after stress relief of the heat affected zone, and prior to modification of a microstructure of a base metal adjacent to the heat affected zone.

A further embodiment of any of the foregoing methods, wherein the post-weld stress relief operation further comprises a fourth heat treatment step performed on the heat affected zone after the third heat treatment step, the fourth heat treatment step consisting of an aging heat treatment.

A further embodiment of any of the foregoing methods, wherein the first and second superalloy workpieces comprise at least one of: rotor components, bladed disks, and shaft components.

An embodiment of a welded structure includes a weld region joining a first superalloy workpiece and a second superalloy workpiece. The first and second superalloy workpieces include respective first and second base material regions including a solution-treated gamma matrix phase and a gamma-prime precipitate phase. The weld region includes a heat-affected zone of the first and second superalloy workpieces adjacent to a portion of the first and second base material regions. The weld region, including the heat affected zone, is not stress-relieved such that the portions of the first and second base material regions, adjacent to the heat affected zone, are not aged.

The structure of the preceding paragraph can optionally include, additionally and/or alternatively, any one or more of the following features, configurations and/or additional components:

A welded structure according to an exemplary embodiment of this disclosure, among other possible things includes a first superalloy workpiece; a second superalloy workpiece comprising respective first and second base material regions including a solution-treated gamma matrix phase and a gamma-prime precipitate phase; and a weld region joining the first and second superalloy workpieces to form the welded structure, the weld region including a heat-affected zone of the first and second superalloy workpieces adjacent to a portion of the first and second base material regions; wherein the weld region, including the heat affected zone, is not stress-relieved such that the portions of the first and second base material regions adjacent to the heat affected zone are not aged.

A further embodiment of the foregoing structure, wherein a first constituent element is operative to reduce the melting temperature of the gamma matrix phase.

A further embodiment of any of the foregoing structures, wherein the first constituent comprises boron or carbon.

A further embodiment of any of the foregoing structures, wherein the base material regions adjacent to the heat affected zone are partially but not fully stabilized avoiding accumulation of the first constituent element at or proximate a plurality of grain boundaries adjacent to the heat affected zone.

An embodiment of a welded structure includes a weld region joining a first superalloy workpiece and a second superalloy workpiece. The first and second superalloy workpieces include respective first and second base material regions including a solution-treated gamma matrix phase and a gamma-prime precipitate phase. The weld region includes a heat-affected zone of the first and second superalloy workpieces adjacent to a portion of the first and second base material regions. The weld region, including the heat affected zone, includes a post-weld stress relief region such that the portions of the first and second base material regions, adjacent to the heat affected zone, are not overaged.

The structure of the preceding paragraph can optionally include, additionally and/or alternatively, any one or more of the following features, configurations and/or additional components:

A welded structure according to an exemplary embodiment of this disclosure, among other possible things includes a first superalloy workpiece; a second superalloy workpiece comprising respective first and second base material regions including a solution-treated gamma matrix phase and a gamma-prime precipitate phase; and a weld region joining the first and second superalloy workpieces to form the welded structure, the weld region including a heat-affected zone of the first and second superalloy workpieces adjacent to a portion of the first and second base material regions; wherein the weld region includes a post-weld stress relieved region such that the portions of the first and second base material regions adjacent to the heat affected zone are not overaged.

A further embodiment of the foregoing structure, wherein the portions of the base material regions adjacent to the heat affected zone are at least partially stabilized and fully aged but not overaged.

A further embodiment of any of the foregoing structures, wherein the superalloy workpieces comprise at least one of: rotor components, bladed disks, and shaft components.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A joining method comprising:
performing a first heat treatment step on a first superalloy workpiece and a second superalloy workpiece, at least one of the first and second superalloy workpieces comprising a gamma matrix phase and a gamma-prime precipitate phase, and further comprises a first constituent element operative to reduce a melting temperature of the gamma phase;
metallurgically joining the first and second superalloy workpieces using at least one solid-state joining process;
a second heat treatment step after the first heat treatment step and prior to the metallurgical joining step; and
performing a post-weld stress relief operation on the joined first and second superalloy workpieces;
wherein the first heat treatment step excludes an aging heat treatment and includes a solution heat treatment;
wherein the first constituent element is entirely dispersed in the gamma phase after the first heat treatment step; and
wherein the second heat treatment step excludes an aging heat treatment and includes a first partial stabilization step terminating prior to substantial accumulation of the first constituent element at or proximate a plurality of grain boundaries in an area of the first and second workpieces to be joined during the metallurgical joining step, substantial accumulation being less than an amount sufficient to cause overaging of the respective areas to be joined.

2. The joining method of claim 1, wherein the first constituent element comprises boron or carbon.

3. The joining method of claim 1, wherein the post-weld stress relief operation comprises a third heat treatment step performed on a heat affected zone after the metallurgical joining step, the third heat treatment step consisting of a second partial stabilization step terminating after stress relief of the heat affected zone, and prior to modification of a microstructure of a base metal adjacent to the heat affected zone.

4. The joining method of claim 3, wherein the post-weld stress relief operation further comprises a fourth heat treatment step performed on the heat affected zone after the third heat treatment step, the fourth heat treatment step consisting of an aging heat treatment.

5. The joining method of claim 1, wherein the first and second superalloy workpieces comprise at least one of: rotor components, bladed disks, and shaft components.

6. The joining method of claim 1, wherein the first partial stabilization step terminates prior to modification of a microstructure of a base metal adjacent to the heat affected zone.

* * * * *